US006993495B2

(12) United States Patent
Smith, Jr. et al.

(10) Patent No.: US 6,993,495 B2
(45) Date of Patent: Jan. 31, 2006

(54) DYNAMICALLY ASSIGNING A SURVEY TO A RESPONDENT

(75) Inventors: Leroy Smith, Jr., Leonia, NJ (US); Jody Francis Powlette, Bellbrook, OH (US); Florian Michael Kahlert, Norwalk, CT (US)

(73) Assignee: Insightexpress, L.L.C., Stamford, CT (US)

( * ) Notice: Subject to any disclaimer, the term of this patent is extended or adjusted under 35 U.S.C. 154(b) by 691 days.

(21) Appl. No.: 09/781,523

(22) Filed: Feb. 8, 2001

(65) Prior Publication Data

US 2002/0128898 A1 Sep. 12, 2002

Related U.S. Application Data

(63) Continuation-in-part of application No. 09/034,774, filed on Mar. 2, 1998, now Pat. No. 6,477,504.

(51) Int. Cl.
G06F 17/60 (2006.01)

(52) U.S. Cl. ...................................................... 705/10
(58) Field of Classification Search .................... 705/10
See application file for complete search history.

(56) References Cited

U.S. PATENT DOCUMENTS

| 5,297,250 | A | 3/1994 | Leroy et al. |
| 5,619,558 | A | 4/1997 | Jheeta |
| 5,701,400 | A | 12/1997 | Amado |

(Continued)

FOREIGN PATENT DOCUMENTS

| EP | 0703540 A2 | 3/1996 |
| JP | 04372080 | 12/1992 |
| JP | 407141322 A | 6/1995 |
| WO | WO 96/08779 A1 | 3/1996 |
| WO | WO 99/07144 A1 | 2/1999 |

OTHER PUBLICATIONS

American Consumer Opinion™ website, Archived on web.archive.org [http://web.archive.org/web/*/http://www.acop.com], dated Mar. 27, 1997, retrieved on Sep. 30, 2003.*
"InterSurvey is Providing Polls on 2000 Election for Leading Women's Web Community, iVillage.com." PR Newswire, p. 2250, Dec. 16, 1999.*
"Palo Alto Startup Solves Consumer Research Dilemma With First Web–Based Probability Sample." PR Newswire, Nov. 8, 1999.*
Declaration of Jody Powlette, dated Mar. 22, 2000, 2 pages.
Letter from Ari Kahan (Attorney for David Zotter) dated Mar. 26, 1999, regarding a Project Freeform, 3 pages.
"World Wide Web Survey Assistant—Software for Internet Surveys & Tests," Internet Article, Sep. 1997, 23 pages.
"Surveytool 1.0 User's Guide, Part No. 801–5059–01, Revision 2.0" Surveytool 1.0 User's Guide, Mar. 1, 1993, XP 002073635, pp. 16–93.

(Continued)

Primary Examiner—Susanna Meinecke-Díaz
(74) Attorney, Agent, or Firm—Brian D. Hickman; Hickman Palermo Truong & Becker LLP

(57) ABSTRACT

A method and apparatus for assigning a survey to a respondent are provided. According to one technique, a set of one or more screening questions are generated and provided to the respondent. Input data is received in response to the respondent answering the set of one or more screening questions. Based on how the respondent answered the set of one or more screening questions, it is determined which survey should be presented to the respondent. According to another aspect, the set of one or more screening questions is generated based on the target participation criteria that is associated with one or more active surveys.

39 Claims, 11 Drawing Sheets

U.S. PATENT DOCUMENTS

| | | | |
|---|---|---|---|
| 5,701,451 A | | 12/1997 | Rogers et al. |
| 5,802,502 A | | 9/1998 | Gell et al. |
| 5,819,282 A | | 10/1998 | Hooper et al. |
| 5,848,397 A | | 12/1998 | Marsh et al. |
| 5,862,325 A | | 1/1999 | Reed et al. |
| 5,893,098 A | | 4/1999 | Peters et al. ............... 707/10 |
| 5,913,204 A | * | 6/1999 | Kelly ..................... 705/500 |
| 5,948,061 A | * | 9/1999 | Merriman et al. ......... 709/219 |
| 6,070,145 A | * | 5/2000 | Pinsley et al. ............. 705/10 |
| 6,093,026 A | | 7/2000 | Walker et al. |
| 6,161,059 A | | 12/2000 | Tedesco et al. |
| 6,189,029 B1 | | 2/2001 | Fuerst ..................... 709/217 |
| 6,317,649 B1 | | 11/2001 | Tedesco et al. |
| 6,513,014 B1 | | 1/2003 | Walker et al. |
| 2001/0049621 A1 | | 12/2001 | Raposo |
| 2002/0002482 A1 | * | 1/2002 | Thomas ..................... 705/10 |
| 2002/0002595 A1 | * | 1/2002 | Blumenau ................. 709/218 |
| 2002/0016731 A1 | * | 2/2002 | Kupersmit ................. 705/10 |
| 2002/0032600 A1 | | 3/2002 | Royall, Jr. et al. |
| 2002/0095431 A1 | * | 7/2002 | Mc George et al. ........ 707/200 |
| 2002/0120504 A1 | * | 8/2002 | Gould et al. ................ 705/14 |
| 2003/0120687 A1 | * | 6/2003 | Solomon et al. ............ 707/200 |

OTHER PUBLICATIONS

"Informative, The Real–Time Information Network," http://www.surveybuilder.com, retrieval date Mar. 16, 2000, 1 page.

"Informative, The Real–Time Information Network," http//www.informative.com/survey_builder/benefits.html, retrieval date Feb. 29, 2000, pp. 1–4.

"Informative, The Real–Time Information Network," http://www.surveybuilder.com/survey_builder/how_it_works.html, retrieval date Mar. 16, 2000, 1 page.

"Archives–Corporate PC," http://www.computercurrents.com/magazine/national/1609/crpc 1609.html, retriveal date Feb. 29, 2000, pp. 1–6.

"Computer Magazine Archive," http://cma.zdnet.com/texis/cma/cma/+urve_5yOXFqtvX9vKKDzmwwwm1Fqn h . . . /display.htm retrieval date Feb. 29, 2000, pp. 1–4.

"Infotrieve Online," http://www3.infotrieve.com, retrieval date Mar. 16, 2000, 1 page.

"ClickToMarket Home Page," http://www.clicktomarket.com/home.html, retrieval date Mar. 16, 2000, 4 pages.

"*)*4/^7–7 BuyDomains.com 7–74/^*)*," http://ww.digital-solutionsinc.com/virt_host.cgi, retrieval date Mar. 16, 2000, 3 pages.

"Interactive Survey," http://www.interactivesurvey.com, retrieval date Mar. 16, 2000, 1 page.

"Do–It–Yourself Surveys," http://ww.busreslab.com/ev.htm, retrieval date Mar. 16, 2000, 1 page.

"Automated Service for Internet Surveys Ushers in New Era of Fast, Easy and Affordable Market Research; Eliminates Need for Survey Software, Programming and Administration," Feb. 25, 1998, Sausalito, CA, http://www.surveybuilder.com, 1 page.

"World Wide Web Survey Assistant—Software for Internet Surveys & Tests," http://or.psychology.dal.ca/~wcs/hidden/home.html, retrieval date Jul. 5, 2000, 34 pages.

"Online and disk–by–mail surveys, Senecio Software Inc., ePoll, CATI, CAPI, FloStat, cyber . . , " http://www.senecio.com/, retrieval date Jul. 5, 2000, 16 pages.

Raosoft Product Information, http://www.raosoft.com/products/index.html, retrieval date Jul. 5, 2000, 21 pages.

MessageMedia Home Page, http//www.messagemedia.com/, retrieval date Jul. 5, 2000, 10 pages.

"Simply Surveys," http://www.wsmart.com/simplysurveys/, retrieval date Jul. 5, 2000, 7 pages.

"Computerizing tests, assessments, tutorials and surveys with Question Mark," http://www.questionmark.com/, retrieval date Jul. 5, 2000, 22 pages.

Author unknown, "Liquidcool Freeform," http://www.zotter.com/freeform, retrieved on Jan. 26, 2004, pp. 1–11.

* cited by examiner

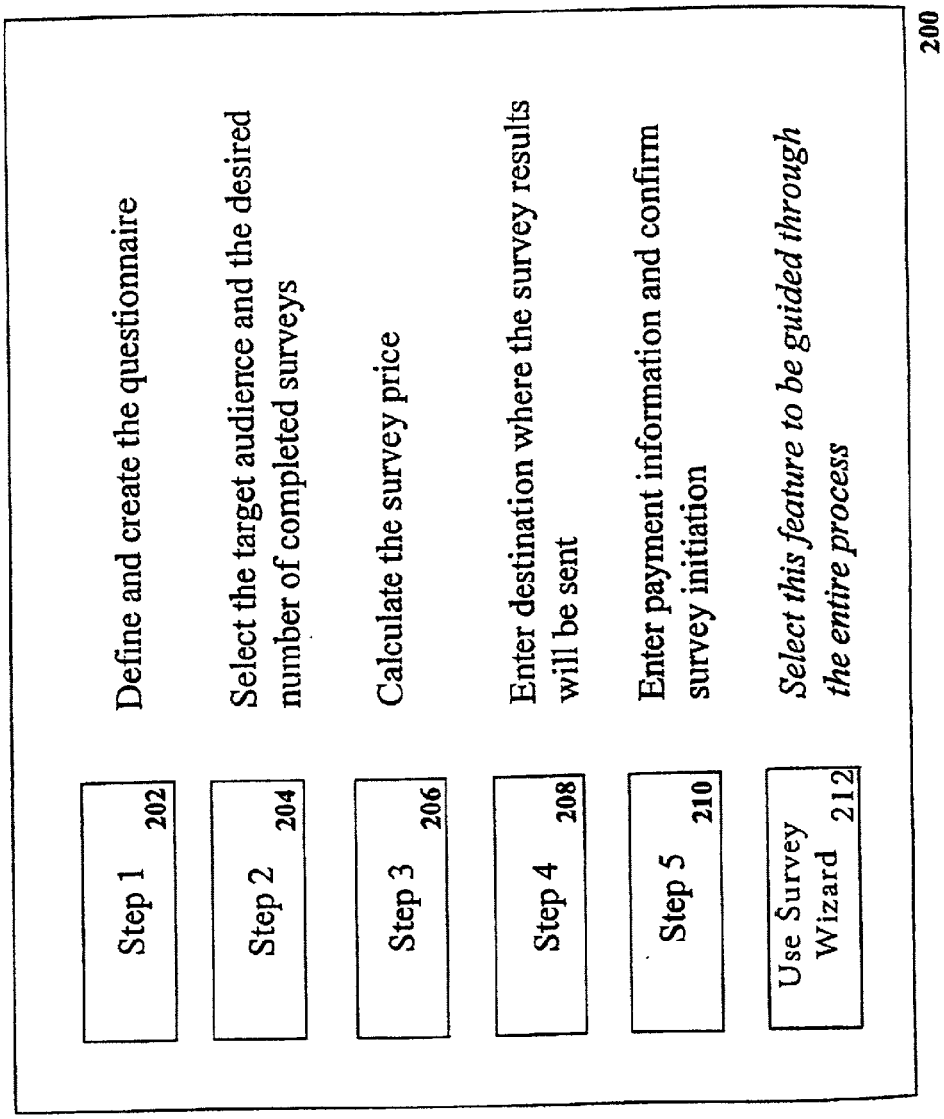
Figure 2B: Example Top-Level Interface Page

Figure 3: Example Interface Page to Generate Questionnaires

*Please select the type of question you wish to ask*

| Question Type | Number of Items | Format |
|---|---|---|
| o Open End | 1 | Text Box ▶ |
| o Yes/No | 1 | Radio Button ▶ |
| o Purchase Intent | 1 | Radio Button ▶ |
| o Agreement | 1 | Radio Button ▶ |
| o Satisfaction | 1 | Radio Button ▶ |
| o Importance | 1 | Radio Button ▶ |
| o Value | 1 | Radio Button ▶ |
| o Single Select List | 4 | Drop Down ▶ |
| o Multi-Select List | 4 | Check Box ▶ |

*Now, enter the completing phrase in the text box below:*

SUBMIT  RESET

Figure 4: Example of Question Types

1. *Using the following scale, how frequently do you read the newspaper? (Select one).*
   - ○ Every day
   - ○ Once a week
   - ○ Once a month
   - ○ I do not read any newspapers 2. *Which newspapers do you read? (Select all that apply).*
   - ☐ New York Times
   - ☐ Wall Street Journal
   - ☐ USA Today
   - ☐ Other
   - ☐ None of the above 3. *Would you be interested in receiving a free newspaper? (Select one).*
   - ○ Yes
   - ○ No 4. *What would encourage you to subscribe to another newspaper?*

[SUBMIT] [RESET]

Fig. 5: EXAMPLE REAL-TIME PRICING INTERFACE PAGE

THE PARAMETERS YOU HAVE SELECTED FOR YOUR STUDY INCLUDE:

NUMBER OF QUESTIONS: 15
TARGET GROUP: FEMALES AGES 21 - 45
NUMBER OF COMPLETES: 200
DAYS IN FIELD: 2

THE PRICE FOR YOUR SURVEY IS  $1,500.00 USD — 502

| CHANGE QUESTIONS 504 | ALTER THE NUMBER OF QUESTIONS |
| CHANGE TARGET 506 | ALTER THE TARGET GROUP |
| CHANGE COMPLETES 508 | ALTER THE NUMBER OF DESIRED COMPLETES OR DAYS IN THE FIELD |
| SURVEY WIZARD 510 | ACCEPT AND CONTINUE BEING GUIDED THROUGH THE PROCESS BY SURVEY WIZARD |

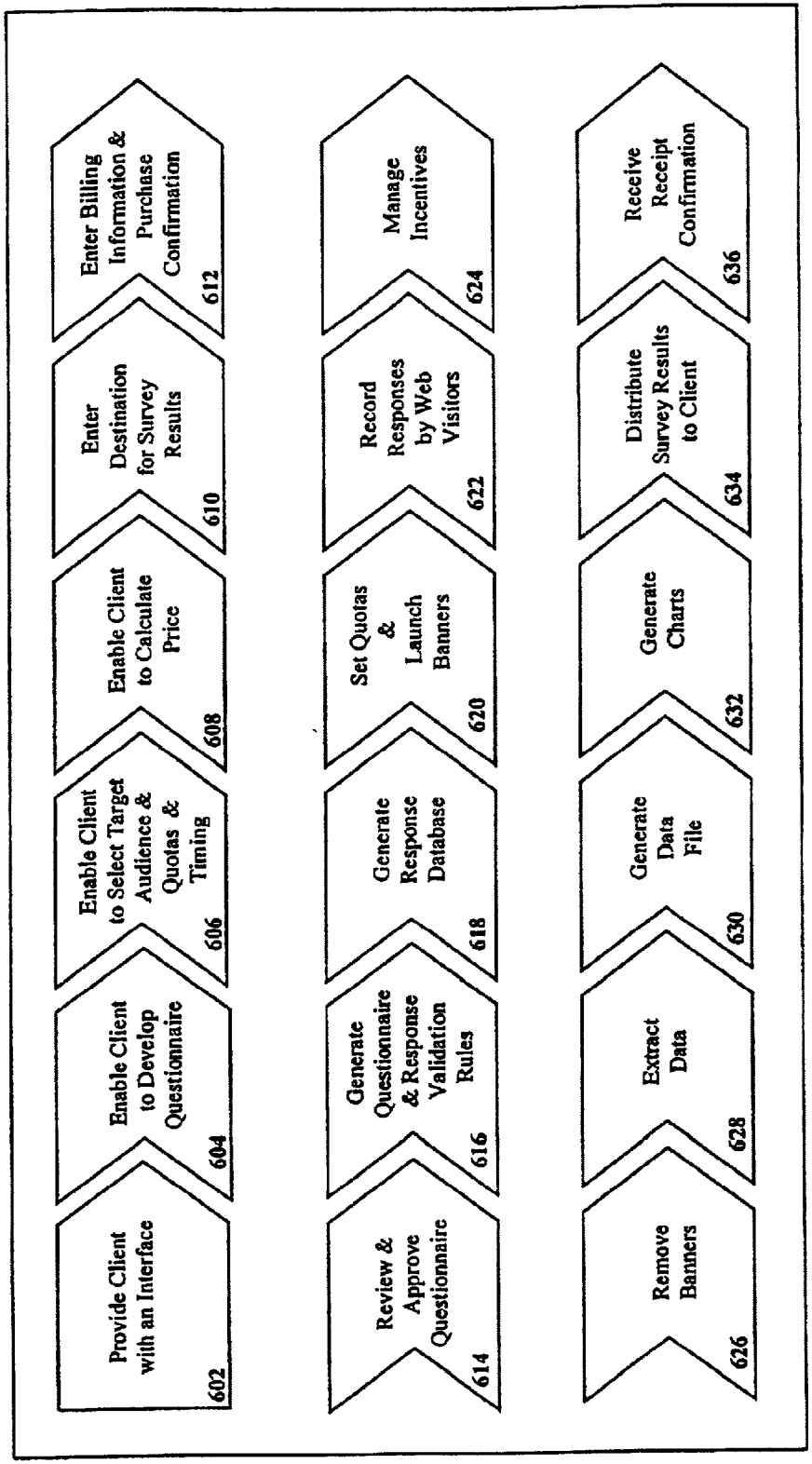
Figure 6: Process Flow Diagram for Automated Survey Generation, Fielding, Processing, and Results Delivery

FIG. 9

EXAMPLE SET OF ACTIVE SURVEYS 900

| ID | % Complete | Completes | Views | Age (hours) | Incidence | Target | Quotas |
|---|---|---|---|---|---|---|---|
| 23271 | 0.1 | 10/100 | 30 | 1 | 0.5 | Technology | |
| 19223 | 0.503333333333 | 302/600 | 1159 | 1 | 0.55 | Adults (18+) | |
| 12748 | 0.515 | 309/600 | 739 | 1 | 0.55 | Adults (18+) | Females: 158/330<br>Males 144/330 |
| 23229 | 0.51 | 153/300 | 516 | 2 | 0.55 | Adults (18+) | |

Total surveys running: 4
Completes needed:
Technology: 90
Adults (18+): 736
Females: 172
Males : 186

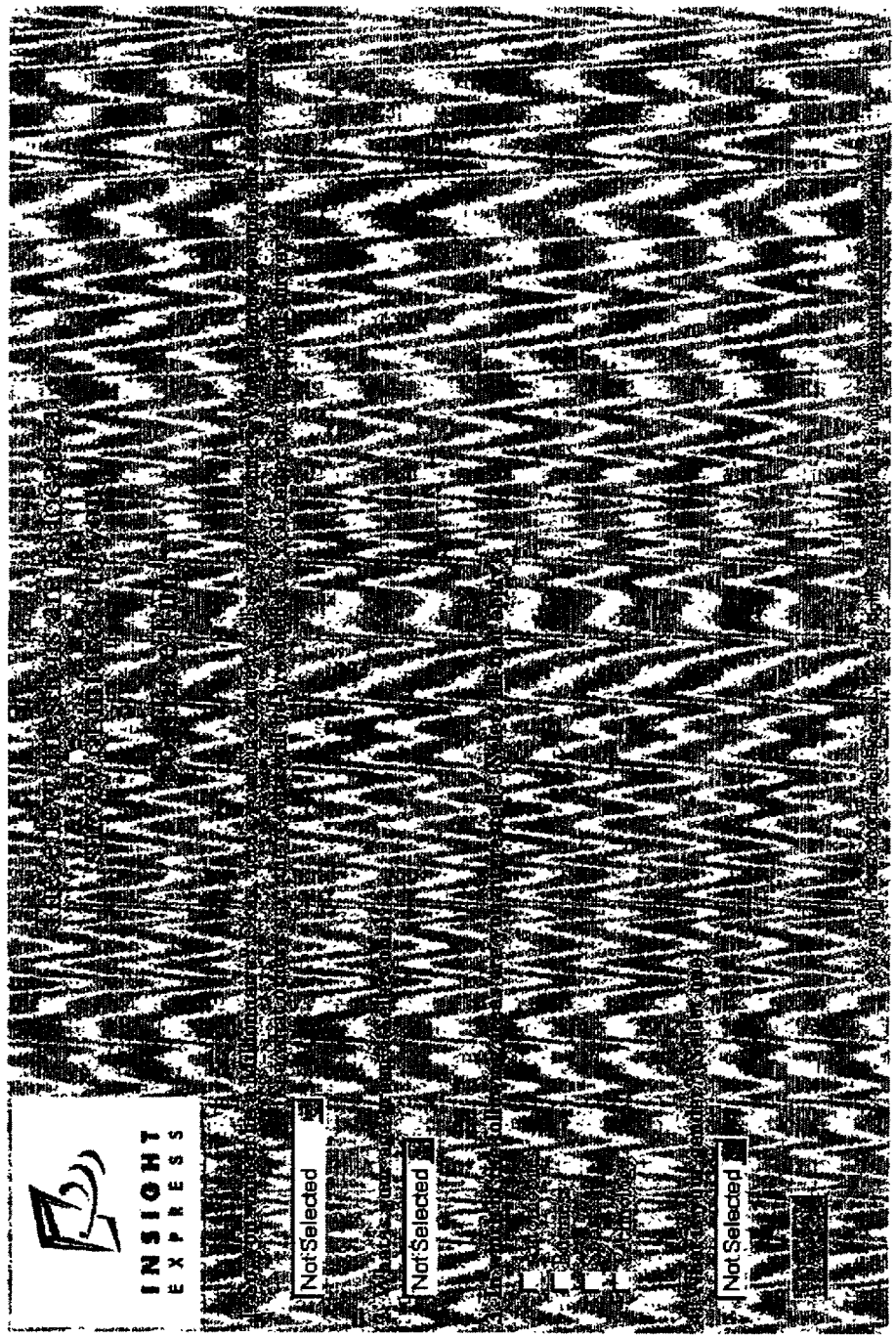
FIG. 10  EXAMPLE SET OF SCREENING QUESTIONS 1000

DYNAMICALLY ASSIGNING A SURVEY TO A RESPONDENT

CLAIM OF PRIORITY

This application is a continuation-in-part of U.S. patent application Ser. No. 09/034,774 which was filed on Mar. 2, 1998, now U.S. Pat. No. 6,477,504 entitled "METHOD AND APPARATUS FOR AUTOMATING THE CONDUCT OF SURVEYS OVER A NETWORK SYSTEM", the contents of which is hereby incorporated by reference in its entirety.

FIELD OF THE INVENTION

The present invention relates to online surveys, and more particular to a method and apparatus for dynamically assigning a survey to a respondent.

BACKGROUND OF THE INVENTION

Before proceeding with a particular product, service, strategy, or tactic, it is often desirable to obtain information about the behaviors, opinions, and attitudes of the marketplace. These data will often help predict if potential customers will be interested in acquiring the product or service or how they may react to a given strategy or tactic.

Market research plays an important role in understanding the current and future wants, needs, and behaviors of the marketplace. It is often applied in business-to-business and business-to-consumer applications. As a result, many companies invest a significant amount of money, time, and resources in market research programs.

Typically, if someone (a "client") requires a better understanding of the market place, they will obtain information using an in-house market research department, an out-of-house third party market research firm, or both.

To obtain the requested information, individuals within research groups typically perform a series of linked steps. For example, these steps may include:

(1) working with the client to define the problem;

(2) designing a research instrument (i.e. a survey);

(3) creating the research instrument (writing/producing the survey);

(4) fielding the instrument using mail, telephone, in-person or Internet-based media;

(5) processing the data obtained and analyzing the results; and (6) generating a report of findings for the client.

In conducting market research, a critical component of providing high quality, non-biased, and cost-effective results involves the recruitment and assignment of qualified individuals to a relevant research initiative or survey. As used herein, a "qualified" individual is an individual that possesses the necessary characteristics that are required for participation within a particular survey. A respondent is defined as an individual possessing the desire or willingness to participate in an active survey and a "qualified" respondent is a respondent who possesses both the willingness and the necessary characteristics that are required for participation within a particular survey.

The process of recruiting qualified individuals and assigning them to active or upcoming surveys is often complex, time consuming, expensive, and error-prone. This problem has long existed in all areas of market research. However, the ability to efficiently assign a survey to a qualified individual offers tremendous value to all constituencies involved. For example, the ability to efficiently assign a survey to a qualified individual can provide the following benefits:

(i) heightened relevancy for research participants, (ii) increased overall research quality through higher completion rates driven by respondent relevancy, and (iii) maximized benefits for the market research company Conventionally, to acquire the appropriate number of qualified respondents for a research study, over-sampling is often employed. Over-sampling involves contacting a large number of people and searching for those persons who possess the required characteristics or criteria that is required for participation in a particular survey. Those individuals possessing the necessary criteria or characteristics are invited to participate in the survey while those who do not are dismissed. Unfortunately, over-sampling tends to increase the time, resources, and the cost required to complete a research initiative due to large number of "dismissals" that are typically incurred (those who do not possess the required characteristics and are subsequently dismissed). Additionally, over-sampling among a low incidence audience often raises the time or financial requirements to a prohibitive level, thus often forcing many clients to abandon their research initiatives.

One method of reducing the overhead that is incurred by over-sampling is through the profiling or targeting of qualified respondents. Profiling or targeting can offer an alternative to over-sampling when attempting to acquire feedback from a desired number of qualified respondents. Profiling or targeting involves the use of pre-existing information about a pool of potential qualified respondents. Using this information, individuals are selectively invited to participate in research initiatives. However, while targeting overcomes some of the deficiencies associated with over-sampling, a significant drawback is that the practice of targeting individuals requires both a large amount of initial data collection and a willingness to perform ongoing data collection and management to ensure the accuracy of the collected information over time. Within the market research industry, maintaining current and accurate information is troublesome, expensive, and increasingly subject to privacy issues.

Based on the foregoing, it is clearly desirable to provide a mechanism that can offer an efficient, fast, and cost-effective solution to qualifying individuals and for inviting those qualified individuals to participate in appropriate and relevant surveys.

It is further desirable to provide a mechanism that can increase the value of a company's market research by heightening the relevancy for individuals who share their opinions in market research initiatives, and significantly increasing the quality of the conducted research through improved completion rates.

SUMMARY OF THE INVENTION

According to one aspect of the invention, techniques for assigning a survey to a respondent are provided. According to one technique, a set of one or more screening questions are generated and provided to the respondent. Input data is received in response to the respondent answering the set of one or more screening questions. Based on how the respondent answered the set of one or more screening questions, it is determined which survey should be presented to the respondent.

According to another aspect, the set of one or more screening questions is generated based on the target participation criteria that is associated with one or more active surveys.

According to still another aspect, in determining which survey to present to the respondent, a candidate group of one or more surveys is identified from one or more active surveys based on the input data that is received from the respondent. A particular active survey from the candidate group of one or more surveys is then selected based on the current survey participation data that is associated with the candidate group of one or more surveys.

According to another feature, a method for assigning surveys is provided by a receiving a participation request from a respondent to participate in a survey. Also received is supplemental information that includes content that identifies one or more characteristics about the respondent. Based the content of the supplemental information, a particular survey is selected and presented to the respondent.

The invention also encompasses a computer-readable medium, a computer data signal embodied in a carrier wave, and an apparatus configured to carry out the foregoing steps. Other features and aspects will become apparent from the following description and the appended claims.

BRIEF DESCRIPTION OF THE DRAWINGS

The present invention is illustrated by way of example, and not by way of limitation, in the figures of the accompanying drawings in which like reference numerals refer to similar elements and in which:

FIG. 2B is an example of a top-level interface page in accordance with the present invention;

FIG. 3 is an example of an interface page that can be used by the user to generate questions and responses in defining a survey;

FIG. 4 is an example of different response types that may be associated with a particular question in accordance with the present invention; and FIG. 5 is an example of the real-time pricing capability associated with the invention;

FIG. 6 illustrates a flow diagram for automating a survey over a network system in accordance with the present invention;

FIG. 9 illustrates an example set of active survey data that may be maintained for the active surveys; and FIG. 10 illustrates is an example of a set of screening questions that may be displayed on client for a respondent.

DETAILED DESCRIPTION OF THE PREFERRED EMBODIMENT

A method and apparatus for dynamically assigning a survey to a respondent is described. In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

Hardward Overview

Figure 1:
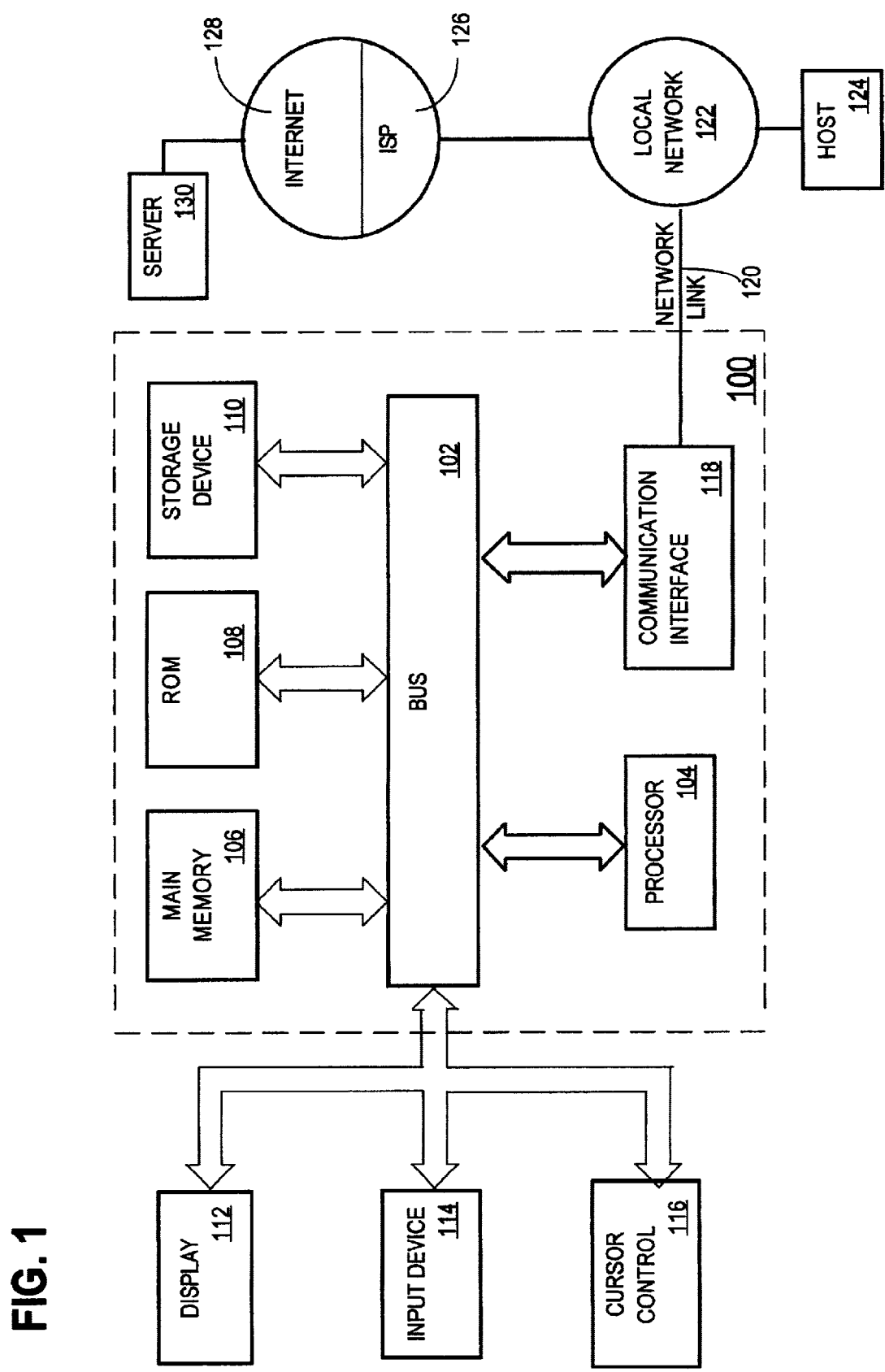
FIG. 1 is a block diagram of a computer system upon which an embodiment of the invention may be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for dynamically assigning a survey to a respondent. According to one embodiment of the invention, a survey is dynamically assigned to a respondent by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for dynamically assigning a survey to a respondent as described herein.

The received code may be executed by processor 104 as it is received, and/or stored in storage device 110, or other non-volatile storage for later execution. In this manner, computer system 100 may obtain application code in the form of a carrier wave.

Functional Overview

A system for dynamically assigning a survey to a respondent is described herein. According to one embodiment of the invention, in response to receiving a request to participate in a survey, a set of one or more screening questions are generated and presented to a respondent to determine the particular survey that should be provided to the respondent. In certain embodiments, the contents of the screening questions are based, at least in part, on target participation criteria that is associated with the currently available, and possibly soon to be available, surveys ("active surveys"). In addition, other "supplemental" information, such as cookie, URL parameter or other browser-based information may be used to determine the contents of the screening questions.

The screening question may be provided to the respondent using a variety of different communication protocols and languages that are transmitted over one or more network systems. For example, a screening question interfaces may be generated using a variety of different page formats that may include, but is not limited to, HTML, XML, Java Script, Applets, or any other type of language or format that can be used to present the screening questions to a respondent. Similarly, the network systems may include a company's private network, a public network, such as the Internet, one or more wireless connections, or any combination thereof.

Based on the input data that is received in response to the respondent answering the screening questions, a candidate group of zero or more surveys is identified from the set of active surveys. In one embodiment, if the candidate group of surveys consists of a single active survey, that survey is selected and presented to the respondent for their participation. Alternatively, if the candidate group of surveys consists of two or more active surveys, other information, such as statistical information about the two or more active surveys, is used to determine which survey to present to the respondent. For example, current survey participation data that provides statistics about the two or more surveys may be used, at least in part, to determine which of the two or more surveys should be selected and presented to the respondent for their participation. Similarly, if the candidate group of surveys consists of zero active surveys, then the current survey participation data associated with one or more of the active surveys can be used to determine which of the active surveys, if any, should be selected and presented to the respondent for their participation.

Once the particular survey is selected, the survey is forwarded to the respondent for completion. The results of the survey are then captured and used to generate statistical information about how the respondents answered the particular survey.

System Overview

Figure 2A:
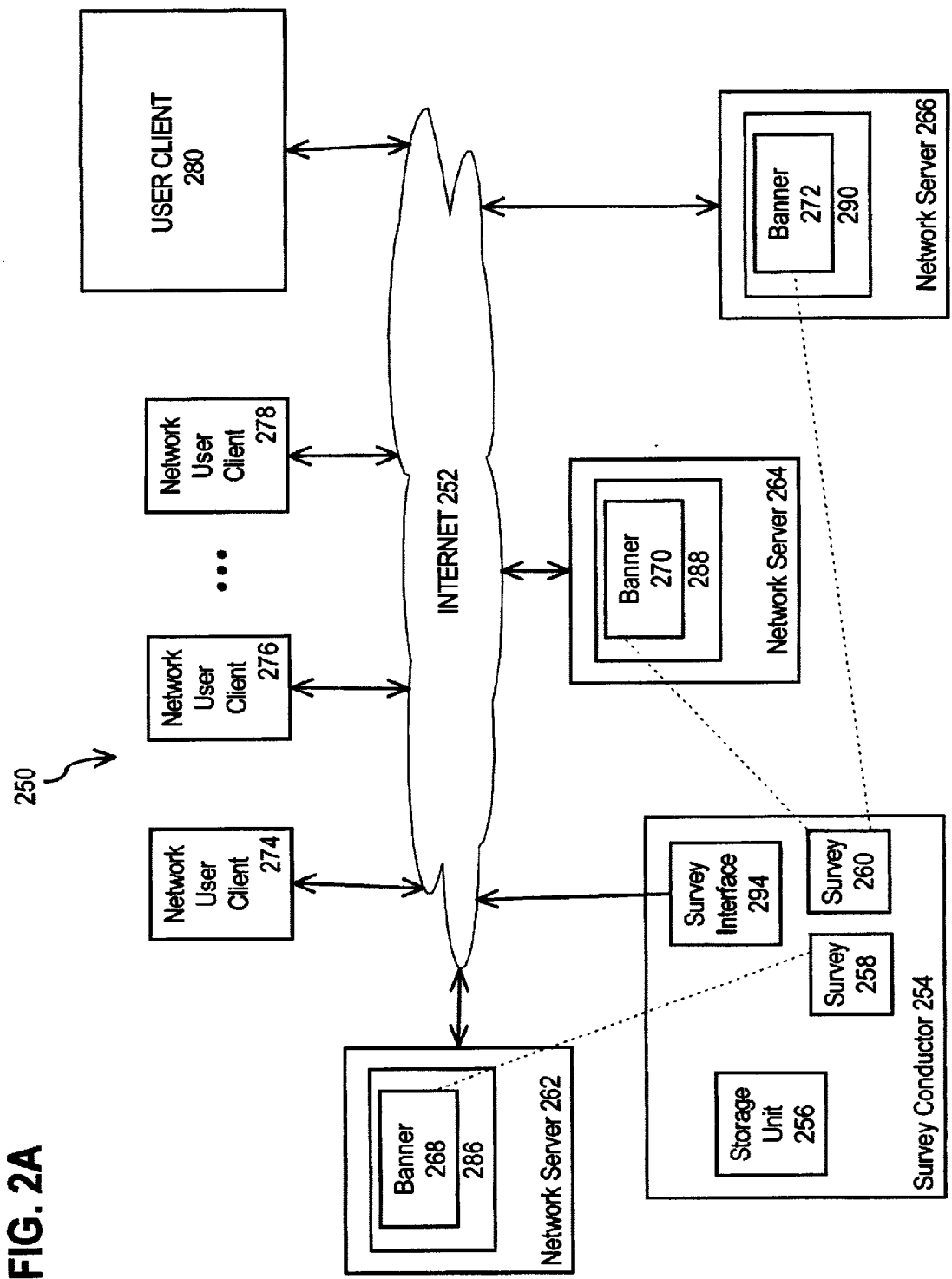
FIG. 2A is a block diagram of a computer system context.

FIG. 2A illustrates in block form an example of the parties and systems involved in this context. In FIG. 2A, a client 280 is coupled either directly or indirectly to the Internet 252. For example, a client 280 may be connected to Internet 252 through a local area network, an Internet Service Provider, an Online Service Provider such as AOL, a proprietary server, or any combination thereof. The user client 280, and the other clients referenced in this description, are end station devices such as a personal computer, workstation, network computer, etc. In the preferred embodiment, the client 280 and other clients have a processor that executes an operating system and a browser program under control of the operating system. The browser program is an industry-standard World Wide Web browser, such as Microsoft Internet Explorer®, Netscape Navigator® or NCSA Mosaic.

Connected to the Internet 252 is a plurality of network user clients 274, 276 and 278. By interfacing with network user clients 274, 276 and 278, network users can access, display and interact with Web pages that are contained on servers that are coupled to Internet 252.

Through Internet 318, user client 280 and network user clients 274, 276 and 278 can connect to the survey conductor server 254. Preferably, client 280 and network user clients 274, 276 and 278 communicate with the survey conductor server 254 using industry-standard protocols such as Transmission Control Protocol (TCP), Internet Protocol (IP), and Hypertext Transfer Protocol (HTTP).

The survey conductor server 254 contains a survey builder 294, a storage unit 296 and a plurality of surveys 258 and 260. Survey builder 294 contains interface data that defines an interface that can be used to create a survey. For example, if a client requests to define a survey, the survey builder 294 automatically sends interface data over Internet 252 to cause an interface to be displayed on the browser executing on user client 280. The client then interacts with the interface to create a survey. The plurality of surveys 258 and 260 represent surveys that have previously been created using survey builder 294. Storage unit 256 is used to store survey results. As network users participate in the surveys, the results are automatically stored in the storage unit 256.

Also coupled to Internet 252 are network severs 262, 264 and 266 each respectively storing data that defines a set of Web pages 286, 288 and 290. The Web pages 286, 288 and 290 may be defined using a variety of methods and formats such as HTML, Java Script, Applets, Word processors, or other software programs. Contained within the set of Web pages 286, 288 and 290 are banners 268, 270 and 272 which may also be defined using a variety of methods and formats. As indicated by the dashed lines, the banners 268, 270 and 272 contain hypertext links to surveys 258 and 260. By selecting a banner, a network user client is automatically provided with a corresponding survey.

Defining a Survey

When a client requests a survey be built, the client is provided with interface data that causes an interface to be displayed on the client's display unit (i.e. computer monitor, television set, etc.). Various mechanisms may be used to present the interface to the client. For example, the client may execute a locally-stored program that generates the interface, or a dynamically delivered JAVA Applet that generates the interface. For the purpose of explanation, embodiments of the invention shall be described in which the interface is delivered to the client in the form of one or more HTML pages. However, the present invention is not limited to any particular mechanism for presenting the interface to the user.

Once the client is presented with the interface, the client may interact with the interface to perform the steps of:

(1) defining a survey (2) identifying a target group of network users or respondents for fielding the survey, the number of required responses, and the timeframe for their response;

(3) calculating the price for the survey;

(4) indicating where the survey result data is to be sent;

(5) confirming the request and entering pertinent payment information.

FIG. 2B illustrates an example of a top-level interface page 200 in accordance with an embodiment of the present invention. As depicted in FIG. 2B, the top-level interface contains six buttons 202, 204, 206, 208, 210, and 212. Each of the six buttons is linked to other interfaces which can be accessed by the client to cause the automation of a survey over the network system. For example, selecting button 202 causes an interface to be displayed that allows the client to enter/select questions and responses for defining a survey; selecting button 204 causes an interface to be displayed that allows the client to select a particular target group or respondents for fielding the survey; selecting button 206 causes the price of the survey to be displayed to the client, facilitating the alteration of study and pricing parameters; selecting button 208 causes an interface to be displayed that allows the client to enter a destination to which the results of the survey are to be sent; selecting button 210 causes an interface to be displayed that allows the client to enter payment information for the automated processing of the survey as defined; and selecting button 212 enables the user to execute a process that "walks" clients through the interfaces so that they may easily use the automated survey mechanism.

FIG. 3 illustrates an example of an interface 300 that is displayed when the client selects button 202, in accordance with an embodiment of the invention. In this example, interface 300 includes a question entry box 320 that allows a client to complete a phrase or enter a question that is to be used in defining a survey. Also included in interface 300 are exemplary response buttons 302–318. The response buttons 302–318 correspond to a particular question type that may be selected for the question that is entered in question entry box 320.

To aid the client in developing questions (i.e., choose the appropriate question type for the particular issue to be addressed, etc.), the client is provided with helpful hints, guidelines, and examples. These helpful hints and guidelines are typically provided through the use of suggested question types that are frequently used in the field of market research. For example, in defining the survey the client may be provided with hints and guidelines for the phrasing of questions to limit bias and minimize the risk of offending network users, the proper ordering of questions to create a logical and easy-to-answer survey, etc.

By selecting a particular question type button, the client begins the question definition process. For example, in certain embodiments when the client selects the question type button 308 (question type of "Agreement"), the client is presented with the introductory phrase:

"Using the scale below, please indicate how strongly you agree or disagree with the following statement: . . . ."

The client may then enter text to complete the question as desired. In certain embodiments, the client has the option to overwrite the entire introductory phrase to create their own custom question.

After the client has completed the question, they are then presented with appropriate responses relevant to the selected question type. For example, in selecting the response button 308 for the response type "Agreement," the client is presented with the following default responses:

(i) Strongly Agree
(ii) Agree
(iii) Neither Agree nor Disagree
(iv) Disagree
(v) Strongly Disagree
(vi) Don't Know In certain embodiments, the client can add, delete, or change one or more of the default responses associated with a particular question type as deemed appropriate by the client. For example, the client may decide to change the response (iii) from "Neither Agree nor Disagree" to "Neutral," or simply delete the response (vi) "Don't Know."

In certain embodiments, clients can select the structure and presentation of questions to network users. Box 322 enables the client to interact with the interface to create a single question or a "table" of questions. If the client enters a value of 1 for "Number of Items" in box 322, a single question is created. For example, if the client selects the question type of "Agreement" and enters a value of 1 in box 324, the following question can be generated.

Using the scale below, please indicate how strongly you agree or disagree with the following statement: I enjoy sports.
  Strongly Agree
  Agree
  Neither Agree nor Disagree
  Disagree
  Strongly Disagree If the client enters a value greater than 1 in box 322, a "table" with the specified number of items can be created and presented to network users. For example, if the client entered a value of 4 in box 322, the following table can

| Using the scale to the right, please indicate how strongly you agree agree or disagree with the following statements: I enjoy | Strongly Agree | Agree | Neither Agree nor Disagree | Disagree | Strongly Disagree |
|---|---|---|---|---|---|
| Reading | ○ | ○ | ○ | ○ | ○ |
| Sleeping | ○ | ○ | ○ | ○ | ○ |
| Working | ○ | ○ | ○ | ○ | ○ |
| Exercising | ○ | ○ | ○ | ○ | ○ |

Tables enable network users to efficiently review and answer multiple items, reducing the amount of time and effort required to complete a set of questions or survey.

By selecting the value in box 324, clients may choose the presentation format of a question. For example, selecting a value of "Radio Button" in box 324, the following question format is presented to the network user.

Using the scale below, do you enjoy reading?
  Yes
  No

The same question is presented to network users in the following format if the client selected box 324 to be "Drop Down."

Using the scale below, do you enjoy reading?

| Click Here ▼ |
|---|
| Yes |
| No |

Enabling clients to select presentation formats makes surveys more versatile, user-friendly, and interesting for network users.

In certain embodiments, the client may include "branching" in defining the survey. The inclusion of branching in the survey allows for a different survey question to be presented based on previous response(s). For example, FIG. 4 illustrates example questions (402, 406, 410 and 414) that are associated with responses (404, 408, 412 and 416) respectively. By including branching in the survey, if in responding to question 402 a network user taking the survey selects the response option of "I do not read any newspapers" in response 404, then network user may next be presented with question 410 and with response 412. However, if the network user selects a response other than "I do not read any newspapers" then the network user may instead be presented with question 406 and response 408.

At any point while the client is defining the survey, the client has the option of editing, changing, adding, deleting, or reordering any of the previously entered questions, question types, or responses. Reordering enables the client to alter the sequence of questions within the survey, potentially providing a more logical flow within the survey or improving the quality of data provided by network users to eliminate bias or other influences that may adversely affect the survey results.

Clients have the ability to add multiple questions, one after the other, to define the survey. To help the client correctly define the survey, a "View Survey" option is contained on an interface that is provided to the client which allows the client to view how the completed survey will appear to a network user. In certain embodiments, the client can include graphical representations in defining the survey.

For example, to enhance the appearance of the survey, the client may include pictures, drawings, sound, and animations. In certain embodiments, clients may include sound, video, or other "objects" that may engage network users or facilitate communication and interaction with network users.

Clients may develop and save multiple surveys. Each survey may be identified and named by the client. The definition and content of each survey may be maintained persistently across client invocations or log-ins. Furthermore, existing surveys or parts of surveys may be copied, renamed, or modified to create new surveys—expediting the survey development process for experienced clients.

Selecting a Target Group

Once the client is satisfied with the developed survey, a target group of network users must be selected for fielding the survey. In one embodiment, to aid the client in selecting the appropriate target group, the client is provided with a list of predefined target or network user groups. For example, a list of predefined target groups may include:
  (i) children between the ages of 13 and 16
  (ii) bicyclists
  (iii) women who are pregnant
  (iv) men over 45
  (v) people who own computers In addition to the above examples, demographic, lifestyle, behavioral, and interest groups are provided to clients for selection and survey targeting. Clients may also define their own target group or select a representative sample from a myriad of populations.

For the survey to be fielded, the client must specify the number of completed surveys they require (i.e. the number of network users who complete the survey) and the timeframe for obtaining those completed surveys. In certain embodiments, the client is provided with a default or suggested number of completed surveys and timeframes. In one embodiment, the default or suggested number of completed surveys is based on the number of completed surveys that is typically requested or required in the field of market research.

In certain embodiments, the client is able to define a particular duration that the survey is to be "in the field." For example, the client may specify that the survey is to be fielded for two weeks. In another embodiment, the client may use a combination of completed surveys and duration to define how long the survey is to field. For example, the client may request that the survey field for six months or until 10,000 responses are received.

As described in detail below, the number of completed surveys requested and/or the duration that the survey is required to field (among other factors), will typically affect the price of the survey.

Providing Survey Result Data to the Client

When a survey is fielded to a particular target group, the results are gathered, processed, and analyzed to generate survey data that reflects the survey results. To enable the delivery of the survey data, the interface allows the client to specify an address for receiving the survey data. Using the specified address, the survey data may be provided to the client in a variety of formats. For example, in certain embodiments the survey data is provided to the client as a comma separated value file (CSVF) that is attached to an e-mail message and sent over the network system to the specified email addressee. In another embodiment, the survey results are provided to the client in spreadsheet formats that include automated data processing, analyzing, and charting scripts, software, or computer instructions.

In addition to delivering results, in certain embodiments, the client is provided with or allowed to access real-time results (i.e. information about the completed surveys received thus far). In one embodiment, real-time survey data is posted on a site connected to the network system that is accessible by the client.

Pricing Information

Prior to launching a survey, the client is presented with an interface indicating a price for fielding the survey and performing the requested service. Should the price be unacceptable, the client has the ability to iteratively alter the parameters of the survey to obtain an acceptable price. For example, FIG. 5 illustrates sample interface 500 that may be presented to a client. In this example, interface 500 contains a survey price field 502 which indicates the price of the survey as currently defined. Interface 500 also contains a change question button 504, a change target button 506, a change complete button 508 and a survey wizard button 510. By selecting the change button 504, the client is presented with an interface that allows them to add, delete and modify questions that are used in defining the survey. Selecting the change button 506 provides the client with an interface that allows them to change or modify the target group that has been associated with the survey. Selecting the change complete button 508 provides the client with an interface that allows them to change the number of completed surveys previously requested by the client. Selecting the survey wizard button 510 provides the client with a guided, step-by-step sequence that can be used to create a survey.

Payment Information

As previously stated, the interface provides the client with the ability to securely enter payment information. Once the client defines the survey, selects a target group and determines the number of completed surveys and/or a duration for fielding the survey, a survey price is calculated and provided to the client through the interface. Once a client accepts the price of the survey, the client selects a "pay for survey" button and enters pertinent payment information. For example, when a client chooses to proceed with the survey, an interface is provided to the client allowing the client to select a particular form of payment (i.e. credit card, debt card, etc.). In certain embodiments, a client is allowed to enter a customer account number that corresponds to an account or credit line that was previously established.

Screening Requested Surveys

Prior to launching a survey, the automatic survey mechanism has the ability to review and screen surveys to ensure their appropriateness for fielding to network users. In certain embodiments, an automated review of the survey is conducted by comparing components of the survey with a database of prohibited words, phrases, pictures, sounds, or themes. In one embodiment, surveys are automatically provided to an individual who is responsible for reviewing the appropriateness of the survey contents. Once a survey is approved, banners are launched and the survey is fielded.

Generating the Survey

After a client selects the pay button, enters valid payment information, and agrees to the terms and conditions associated with using the automatic survey mechanism, the automated survey mechanism determines the particular location (controlled by the automated survey system) where the survey will reside on the network. The automated survey mechanism then generates a survey based on the information (survey definition) supplied by the client and places it at the identified location. In certain embodiments, the generated survey consists of one or more HTML pages that are accessible over the Internet or Intranets to network users wanting to take the survey.

In addition to generating and storing the survey, the automated survey mechanism generates response validation rules that are automatically enforced. These rules provide a mechanism for validating the responses from network users input as they participate in a survey. In certain embodiments, the response validation rules are linked to the survey to ensure the data provided by a network user is logically valid and consistent with questions in the survey. The response validation rules can be used to increase the quality of the survey data that is provided to the client. In certain embodiments, errors or logical inconsistencies that are identified are reported to the network user thus enabling them to take correct action (i.e. enter valid information).

Additionally, the automated survey mechanism identifies and designates a specific storage unit for storing survey results. A storage unit is linked to each survey and is used to automatically capture survey results from network users who participate in the survey. In certain embodiments a unique storage unit is used to store the results for a particular survey. For example, when a survey is generated, a unique storage unit is identified and attached to the survey such that the results from a network user completing the survey are automatically stored into the unique storage unit. In certain embodiments, the storage unit is a database that can be used to store the survey results that were generated by participating network users.

Fielding the Survey and Launching a Banner

To attract network users of the desired target group to participate in the survey, the automated survey mechanism causes a banner or other recruitment device to be placed, launched, or made available for viewing on a one or more sites on the network system. In certain embodiments, the particular sites for viewing a banner associated with a particular survey are selected based on the target group information that was previously supplied by the client. For example, if the client specified that the target group for a particular survey would be kids 13–18 years of age, then sites associated with this target group are selected as banner locations for the particular survey.

In one embodiment, the automated survey mechanism maintains a static mapping between banner locations and targeted groups. The automated survey mechanism uses this static mapping to identify one or more locations for launching a banner on the network system. For example, a static mapping may exist between a target group of kids 13–18 years of age and specific portions of the Yahoo! site or other "kid-related" locations. Based on this static mapping, those specific portions of the Yahoo! site may be selected as banner locations for a survey targeted for kids 13–18 years of age.

In certain embodiments, a dynamic mapping between target groups and network users is performed by (1) acquiring data that identifies a network user (i.e., name, social security number, etc.), (2) locating within an information repository or database prior information that was obtain about the network user, (3) determining a target group to which the network user belongs based on the information in the repository, and (4) delivering to the network user a Web page that has a banner for a survey targeted to a group to which the network user belongs.

For example, when a network user requests a Web page, the request may contain data (e.g. from a cookie) that identifies the user as John Smith. The host or a process that is linked to the Web page may respond by searching a database for previously gathered information about John Smith. Assume that the database contains information indicating that John Smith is male and 47 years old. Based on this information, it is determined that John Smith falls into the target group of a survey for men over the age of 45. Therefore, a banner for that particular survey is placed in the Web page that is returned to John Smith in response to his request.

Banners can either be statically or dynamically created. In one embodiment, the automatic survey mechanism dynamically creates a particular banner using the target group information that was supplied by the client while defining the survey. The automated survey mechanism then requests the owner of the identified site(s) to launch the dynamically created banner.

In one embodiment, the automated survey mechanism causes a static or predefined banner to be launched at the identified site(s). The static or predefined banner may be maintained by either the site owner(s) or by the automatic survey mechanism. In other embodiments, banners are launched by sending a message to the owner or representative of the identified site(s), requesting that a banner be launched.

Each banner that is launched contains a reference (e.g. hypertext link) to a corresponding survey. Thus, by selecting a particular banner, network users are automatically presented with a corresponding survey. For example, by selecting a particular banner, a network user may be presented with the sample survey as previously described in FIG. 4.

In certain embodiments, network users are requested to enter information about themselves (i.e., age, occupation, etc.) within the banner or recruiting document itself. Using this information, a survey is dynamically identified and presented to the network user. By dynamically identifying a particular survey based on the attributes of a network user, an appropriate survey can be presented to the network user, thus potentially increasing the efficiency of the overall system. For example, if a network user "Tom" selects a particular banner, Tom is prompted to enter certain information about himself (i.e. age and gender). If Tom enters an age of 25 and a gender of male, he is requested to complete a survey that requires males that are 25 or older.

In certain embodiments, banners for a survey that correspond to a specific target group are placed on a general-purpose site (i.e. Yahoo!, AOL, Excite, USA Today, etc.). These banners contain information that specifies the desired target group of network users that are requested to complete the survey. (e.g. "if you are a male over 45, click here")

In certain embodiments, the banner contains information that attempts to attract users of the network system to participate in the survey. For example, a particular banner may state that by participating in the survey, network users are automatically entered into a drawing or sweepstakes for a vacation to Hawaii. Similarly, the banner may also state that network users who complete the survey may receive cash or other forms of incentives.

To reward a network user for completing a survey, the network user may be required to enter certain pertinent information (participant information). For example, if a banner offers Internet account credits for completing a survey, the network user may be required to provide their Internet account number so that they may be credited for participating in the survey.

Because meaningful survey results typically require opinions from a non-biased population, the automatic survey mechanism attempts to prohibit network users from participating in a particular survey multiple times. In one embodiment, the automatic survey mechanism uses cookie information to identify computers that were previously used to complete a particular survey. For example, when a network user completes a survey, cookie information is stored on the computer that identifies the computer as one that has previously been used to participate in the particular survey. Thereafter, when a network user attempts to participate in a particular survey using the same computer, the network user is denied access to the survey. In an alternative embodiment, the automatic survey mechanism maintains previously entered participant information that can be used to identify network users who have previously completed a particular survey.

After the required number of completed surveys is obtained, or the duration for fielding the survey has expired, access to the survey is disabled. The owners of the sites where the corresponding banner was launched are notified that the banner should be removed. Upon receiving the notice, the owner removes the banner from the site or prevents the banner from being displayed, thus eliminating access to the survey by network users.

Gathering and Analyzing Survey Results

After a banner is launched, network users may click on the banner to participate in the survey. When a network user completes a survey, the results are automatically sent over the network system where they are validated and stored in a corresponding storage unit (e.g. database) using the validation and insertion commands that are attached to the survey.

After each response for a particular survey is inserted into the appropriate database, a counter for that particular survey is incremented. If the counter for the survey equals the number of responses requested by the client, the owner of the site on which the banner was launched is notified that the banner should be removed. The results are then processed and analyzed to generate survey data and charts reflecting the gathered survey results. Processing and analysis of the collected data may include, for example, the extraction of the survey data from the database and the creation of cross-tabulations and graphical charts. Once the processing is complete, the survey data is sent to the address that was previously specified by the client while defining the survey.

In certain embodiments, survey results are analyzed on a periodic basis to generate real-time survey data. For example, in one embodiment, the automated survey mechanism generates real-time survey data by causing the survey results for a particular survey to be analyzed on a daily basis. The real-time survey data is then posted at a particular site on the network that can be accessed by the client. This allows the client to obtain survey data while the survey is still being fielded to users of the network system.

The Automated Survey Process

FIG. 6 illustrates a flow diagram for automating a survey over a network in accordance with an embodiment of the invention. At step 602, an automatic survey system generates interface data that defines an interface. The automatic survey system then causes the interface to be displayed on a client's display unit. At step 604, the client interacts with the interface to define a survey. By interacting with the interface, the client can define questions, select responses, edit, reorder, and view the survey.

At step 606, the client selects a target group of network users who are to take and complete the survey. During this step, the client also specifies the number of desired completed surveys and/or the duration the survey is to field. At step 608, the client interacts with the interface to identify the price of the survey based upon the parameters provided by the client in previous steps. At step 608, the client has the capability of returning to steps 602 through 606 to modify the requested survey parameters to produce a survey price that is acceptable to the client.

At step 610, the client uses the interface to provide an address to define where the survey results are to be delivered. At step 612, the client uses the interface to securely provide billing information and to provide final approval to proceed with survey fielding.

At step 614, the survey created by the client is reviewed and screened for propriety. At step 616, the automated survey system generates a survey based on the parameters and data provided by the client. At this step, response validation rules and insertion commands are created and attached to the survey. At step 618, an information repository such as a database is created to store survey results from network users.

At step 620, quotas or the number of completed surveys requested by the client are attached to the database. The automatic survey mechanism then fields the survey by causing one or more banners to be launched, activated, or displayed on one or more sites on the network system.

At step 622, survey responses from network users participating in the survey are captured and inserted into the information repository or storage unit. At step 624, compensation or incentives are managed for network users who complete the survey.

At step 626, the banners are removed from the sites on the network system once the number of desired completed surveys has been achieved. At this step, the automatic survey system sends messages to all appropriate sites indicating the banner should no longer be displayed.

At step 628, the survey results provided by network users are extracted from the storage device. At step 630, the extracted survey results are processed, analyzed, and formatted using common file formats. At step 632, graphical representations of the survey results are generated and inserted into the survey data file.

At step 634, the file containing the results of the survey are sent to the address that was previously provided by the client. At step 636, a receipt confirmation is received from the client indicating the file containing the survey results has been received.

Dynamically Assigning a Survey to a Respondent

A drawback with statically linking or associating a banner or URL to a specific survey is that it provides no mechanism for selecting a different survey that may be better suited or more desirable for participation by the respondent. The same drawback exists when inviting individuals to participate in surveys via e-mail, pop-up surveys, well-know URLs, or other forms. For example, in systems where each banner is linked to a specific survey, upon selecting a banner, the respondent is presented with the survey that is linked to that particular banner even if the respondent may actually possess certain characteristics or attributes that make them better suited for participation in a different active survey. For example, assume that the set of active surveys includes a first survey for all males over 20, and a second survey for all males over 70 that have never worn glasses. If a banner is linked to the first survey, then some respondents that would qualify for the second survey may be given the first survey. If the banner is linked to the second survey, then a high percentage of the respondents will not qualify to take it.

Additionally, by statically linking a banner or URL to a specific survey, the survey system itself has no mechanism for reassigning an individual to a different survey based on the current survey participation data that has already been collected for the active surveys.

Figure 7:
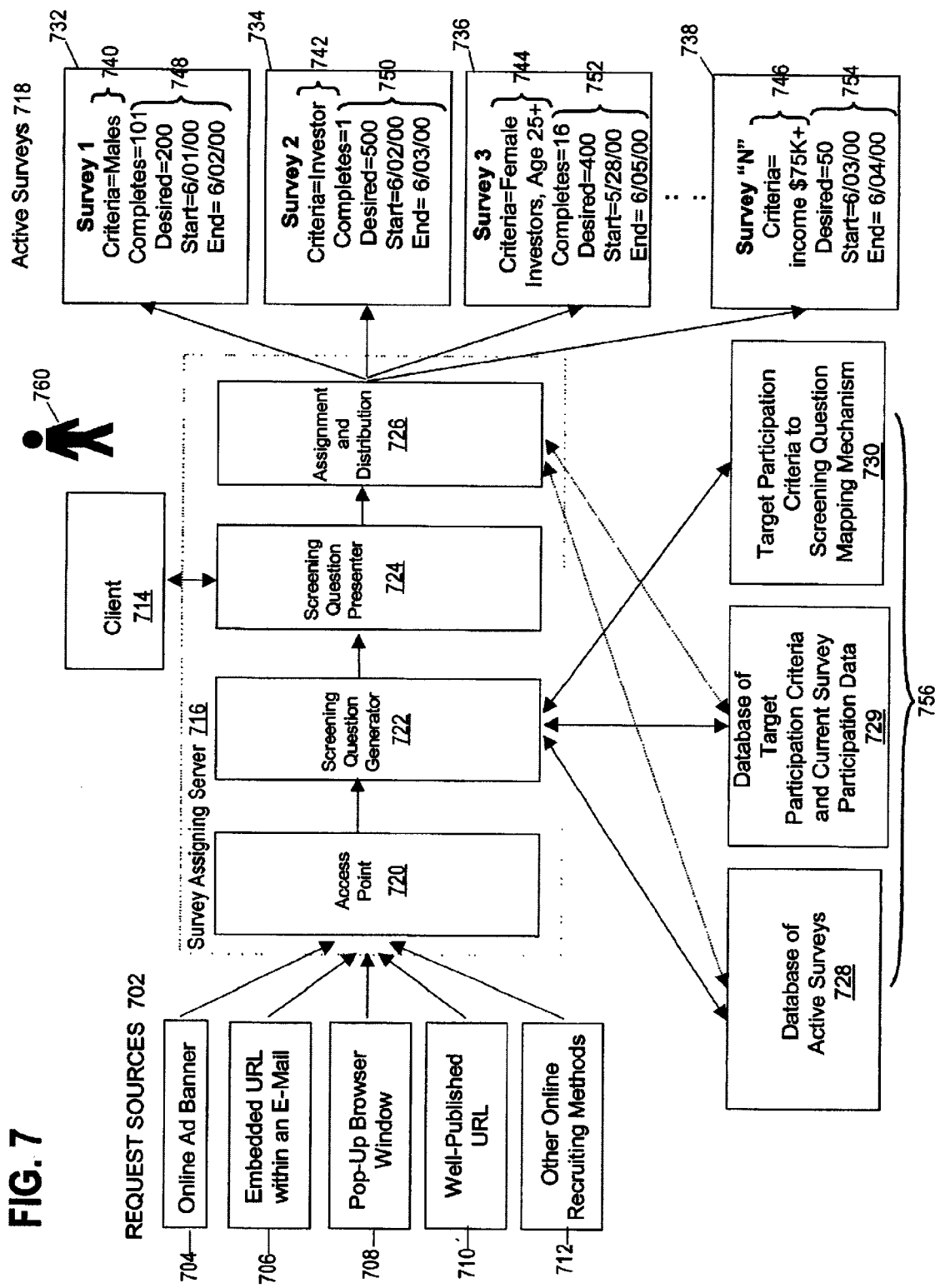
FIG. 7 is a block diagram of a system upon which certain embodiments of the invention may be implemented.

FIG. 7 is a block diagram of a system 700 upon which certain embodiments of the invention may be implemented. Generally, system 700 includes one or more request sources 702, a client 714, a survey assigning server 716, one or more active surveys 718, and a set of participation criteria 756 that is used, at least in part, to dynamically identify and select a particular survey that is to be provided to a respondent.

Request sources 702 represent a variety of mechanisms that may be used to send a message to survey assigning server 716 to request participation in a survey. For example, request sources 702 may include an online advertisement banner 704 that includes a URL associated with survey assigning server 716; an email message 706 that has an embedded URL associated with survey assigning server 716; a pop-up browser window 708 that includes a link to survey assigning server 716; a well published URL associated with survey assigning server 716; or a variety of other online recruiting methods 712 that are configured to send messages to survey assigning server 716 for requesting participation in a survey.

Client 714 is a personal computer, workstation, cellular phone, Palm Pilot, or a variety of other device types that are capable of communicating with survey assigning server 716. Client 714 is used by or associated with a respondent 760. Although a single client 714 is shown in FIG. 7 by way of example, any number of clients can be included in the system 700, and multiple connections may be simultaneously established between different client devices and survey assigning server 716. In certain embodiments, client 714 is configured to execute a browser type application, such as Netscape Navigator®, Microsoft Internet Explorer® or other similar type of WAP or HTML browser application that has been developed for use in high constrained devices. Respondent 760 can use the browser application to communicate with survey assigning server 716 over a network system.

Survey assigning server 716 is a computer, or one or more hardware or software components or processes that cooperate or execute in one or more computer systems. In certain embodiments, survey assigning server 716 is a Web server that is configured to receive requests from respondents and to select and forward a particular survey in response to receiving the requests. For example, survey assigning server 716 may include a servlet process that is configured to respond to clients requests that are initiated by respondents desiring to participate in a survey.

As depicted, survey assigning server 716 may include among other things, one or more active surveys 718, an access point process 720, a screening question generator process 722, a screening question presenter process 724 and an assignment and distribution process 726.

In this example, one or more active surveys 718 consist of a plurality of active surveys 732, 734, 736 and 738. Respectively associated with each of the active surveys 732, 734, 736 and 738 may be a set of target participation criteria (740, 742, 744, 746) and/or a set of current survey participation data (748, 750, 752, 754).

The target participation criteria identifies a specific set of criteria or characteristics that is desirous of those individuals who are to participate in a particular survey. For example, target participation criteria 740 indicates that for a respondent to participate in survey 732 the respondent should be "Male." Conversely target participation criteria 744 indicates that for a respondent to participate in survey 736 the respondent should be "Female", an "Investor" and of age "25" or over.

The current survey participation data identifies a variety of participation information that is associated with each of the surveys. For example, current survey participation data 748 indicates that "101" completes have currently been acquired out of a desired number of "200." Current survey participation data 748 further indicates that the survey became "active" on "Jun. 1, 2000" and is scheduled to become "inactive" on "Jun. 2, 2000," whether or not the desired number of completions has been obtained by that date. As is explained in further detail below, in certain embodiments, the target participation criteria (740, 742, 744, 746) and/or the current survey participation data (748, 750, 752, 754) may be used in determining the set of screening questions that are to be presented to a respondent and in dynamically selecting the specific survey that is presented to the respondent for their participation.

Access point 720 is configured to receive requests for participation in a survey. For example, by selecting online ad banner 704 or an embedded URL within an email 706 that is associated with survey assigning server 716, a participation request message may be sent to and received by access point 720. In certain embodiments, the participation request message may include "supplemental" information about the requesting respondent and/or the client device that was used to send the participation request message. For example, an embedded URL within an email message may include additional parameter information that describes certain characteristics or features of the respondent. Additionally, the participation request message may be information stored on the requesting client device, such as cookie or other browser information, that is also sent to and received by access point 720. In certain embodiments, the supplemental information is used in determining the screening questions that are provided to the respondent. For example, attributes associated with a particular URL (for example, attributes that indicates that the user has selected a banner associated with men's running shoes or that the respondent came from a particular Web site or location), may indicate that the respondent is most likely a man and thus may help to determine the set of screening questions that are most likely relevant to the respondent.

In one embodiment, the supplemental information is used alone, or in combination with a set of screening questions, to identify the particular survey that is to be present to the respondent. For example, if survey assigning server 716 receives cookie information that provides the identity of the requesting respondent and/or specific characteristics about the requesting respondent, the survey assigning server 716 may use the supplemental information to select a particular survey without presenting a set of screening questions to the respondent. As shown by this example, in certain embodiments, survey assigning server 716 may assign a specific survey to a respondent based solely on the supplemental information, thus without requiring any additional input from the respondent.

In response to receiving a participation request message, access point 720 forwards the information to screening question generator 722. Thereafter, screening question generator 722 generates an appropriate set of one or more screening questions for determining the appropriate survey that should be presented to the respondent. How the set of screening questions is determined is explained in greater detail below.

Once the set of one or more screening questions is generated, the screening question presenter 724 transmits interface data to client 714 to cause client 714 to display the set of one or more questions for viewing by respondent 760. Once the respondent completes the set of one or more questions, the respondent's answers are then forwarded back to screening question presenter 724 by client 714. Thereafter, assignment and distribution process 726 uses the respondent's answers, possibly in combination with the target participation criteria and/or set of current survey participation data of database 729, to determine the particular survey that should be presented to respondent 760. The identified survey is then forwarded to client 714 to allow respondent 760 to participate in the particular survey.

As will be explained in greater detail below, assignment and distribution process 726 may use a variety of different target and/or current survey participation data in determining the particular survey that should be presented to respondent 760.

Generating Screening Questions for Respondents

As previously indicated, associated with each survey is a set of zero or more target participation criteria that an individual must possess to qualify and be invited to participate in the particular survey. The following are examples of sets of target participation criteria:

(i) Males (one criterion)
(ii) Females between the ages of 25 and 55 (two criteria)
(iii) Individuals who have visited a particular Web site in the past six months and use a 33.5K or a 56K dial-up modem (three criteria)
(iv) Sports enthusiasts (one criterion)
(v) Anyone (no criteria)

In certain embodiments, one or more databases 756 may be used to store information associated with the one or more active surveys. For example, a database of active surveys 728 may be used to store the URLs, required access codes, survey access restrictions, or other parameters that may be required to access any individual survey. Additionally, in certain embodiments, a database of target participation criteria and current survey participation data 729 is used to store the target participation criteria and the current survey participation data that is associated with the active surveys 718. Still further, in certain embodiments, a screening question mapping mechanism 730 is used by survey assigning server 716 to maintain a mapping between the target participation criteria that is associated with the currently active surveys and a set of corresponding screening questions that will allow assigning server 716 to determine whether an individual actually meets the target participation criteria that is associated with a particular survey.

To determine whether a respondent possesses specific criteria or characteristics, questions are formulated and presented to respondents. Questions may be dynamically generated in response to receiving a participation request. Questions may also be statically defined and linked to corresponding target participation criteria prior to receiving a respondent's participation request. Examples questions include:

|  | Screening Question | Target Participation Criteria |
|---|---|---|
|  | Example 1 |  |
| Question | What is your gender? (Select one) |  |
| Possible Answers | Male | Gender = Male |
|  | Female | Gender = Female |
|  | Prefer Not to say | Gender = Unspecified |
|  | Example 2 |  |
| Question | In which of the following are you interested? (Select all that apply) |  |
| Possible Answers | Automobiles | Interest = Automobiles |
|  | Business | Interest = Business |
|  | Entertainment | Interest = Entertainment |
|  | Sports | Interest = Sports |
|  | Personal Finance | Interest = Personal Finance |
|  | Other | Interest = Other |
|  | None of the Above | Interest = None |

In Example 1 above, a single question is used to determine if a respondent is either male or female. In Example 2, a single question is also used to determine an individual's areas of interest across multiple categories. If both Example 1 and Example 2 are presented to respondents, the gender and interests of the respondent can be easily acquired. In other embodiments (see Examples 3, 4 and 5 below), specific questions (such as Yes/No) can be statically configured or dynamically formulated for each set of target participation criteria that is associated with a particular survey.
Examples include:

|  | Screening Question | Target Participation Criteria |
|---|---|---|
|  | Example 3 |  |
| Question | Are you male? (Select one) |  |
| Possible Answers | Yes | Gender = Male |
|  | No | Gender = Female |
|  | Prefer not to say | Gender = Unspecified |
|  | Example 4 |  |
| Question | Are you interested in automobiles? (Select one) |  |
| Possible Answers | Yes | Interest = Automobiles |
|  | No | Interest = Unspecified |
|  | Prefer not to say | Interest = Unspecified |

|  | Screening Question | Target Participation Criteria |
|---|---|---|
|  | Example 5 |  |
| Question | Are you male and interested in automobiles? (Select one) |  |
| Possible Answers | Yes | Gender = Male |
|  |  | Interest = Automobiles |
|  | No | Gender = Unspecified |
|  |  | Interest = Unspecified |
|  | Prefer not to say | Gender = Unspecified |
|  |  | Interest = Unspecified |

Selecting Questions to Present to a Respondent

When a respondent expresses a desire to participate in a survey, (for example, clicks on a banner, activates a hyperlink, views a pop-up invitation, or arrives through any other recruiting mechanism via a computer network), the survey assigning server 716 dynamically determines which screening questions to present to the respondent based upon current target participation criteria. Below are example criteria that can be used independently or in combination to generate the set of screening questions presented to the respondent.

In one embodiment, to potentially increase the number of respondents who are willing to answer a set of screening questions, it may be desirable, and/or necessary, to reduce the number of screening questions that would normally be presented to a respondent at a single time or on a single Web page. To limit the number of screening questions that are presented a respondent, survey assigning server 716 may be required to select a reduced set of screening questions. A variety of factors may influence the particular selection of the screening questions within the reduced set, some of which are identified below.

Also, in certain embodiments, to potentially increase the likelihood that a respondent will qualify to participate in at least one active survey, the incidence (probability that an individual possesses the required characteristics) associated with the target participation criteria of active surveys are used to determine which screening questions are presented to the respondent. By definition, to locate qualified respondents for target participation criteria possessing a low incidence requires the associated screening questions to be presented to respondents more frequently than high incidence target participation criteria. If many low incidence surveys (each possessing different target participation criteria) are active, it is often not possible nor desirable to present all screening questions to the respondent (due to the maximum number of screening questions per page mentioned above). Consequently, the system must determine which screening questions are to be included to acquire the desired number of completions from low incidence surveys while balancing the probability that a respondent will qualify for at least one survey based upon the generated set of screening questions.

As previously indicated above, in certain embodiments, supplemental information is received from a client and used to determine the set of one or more screening questions that will be presented to a respondent. For example, supplemental information that is passed as parameters within a URL (i.e., http://www.insightexpress.com/ix/screener.asp?target=1 where the parameter is "target" and the value is "1") can be used to determine which questions are to be included or excluded from the set of screening questions. This information is particularly useful when it is known or expected that the respondent possesses or does not possess specific characteristics.

Additionally, supplemental information (such as a referring URL) or information stored within a cookie (i.e., information regarding surveys previously completed by the respondent, etc.), can also be used to determine which questions should be included or excluded from the set of generated screening questions.

In certain embodiments, the current number of "completes" that have been acquired for a particular survey and/or the number of "completes" that are still required for a particular survey may impact which screening questions are presented to a respondent. For example, active surveys that possess fewer completions may be assigned a higher priority, causing questions directed to them to be included within the generated set of screening questions. Similarly, the time remaining until a survey is no longer considered active may also impact which screening questions are selected. For example, surveys that will become inactive within the next one hour may result in a higher probability that their associated screening questions will be included in the generated set of screening questions. Furthermore, the elapsed time of a survey (time since becoming active) and/or the rate of acquired survey completions (number of completions over a specified period of time) can also be used to determine which questions are to be included or excluded within the set of generated screening questions. This approach is particularly helpful in "pacing," throttling, or managing the elapsed time required to obtain the desired number of target completions for a particular survey.

Additionally, derived calculations such as the survey completion rate (the number of respondents who successfully complete the assigned survey divided by the number of respondents who were assigned to the survey) for each active survey can also be used to determine which questions are included or excluded from presentation to the respondent. For example, screening questions associated with surveys with low completion rates may be presented more frequently to respondents to acquire the desired number of completions over a specified time period (compensating for a survey's lower completion rate).

In addition, in certain embodiments, the determination of which screening questions are to be presented to the respondents can be performed on a periodic basis or in response to the occurrence of a specific event (i.e., activation of a new survey, termination of an active survey, the number of times a screening question has been presented to requesting respondents, etc.), in addition to or instead of dynamically generating the set of screening questions upon receiving a respondent's participation request.

As previously indicated, once the set of screening questions is generated, they are then presented to a respondent via a user interface that is provided to a client over a computer network. The screening questions may be presented to a respondent using a single interface window (i.e., single HTML page), or through multiple interface windows (i.e. multiple HTML pages). Additionally, in certain embodiments, a set of cascading screening questions are presented to a respondent based on the respondent's prior answers. For example, survey assigning server 716 may present an initial question to respondent 760 asking whether they are "male" or "female." If respondent 760 indicates that she is a female, survey assigning server 716 may present one or more questions that are directed to females. Alternatively, if respondent 760 indicates that he is a male, survey assigning server 716 may present one or more questions that are directed to males. The cascading of questions is not limited to any particular number of questions.

The participation criteria identified above is provided as an example of some of the types of criteria that may be used in determining a set of one or more screening questions to present to a respondent. Thus, other types of target participation criteria and/or current survey participation data may be used to generate a particular set of screening questions. For example, a country-of-residence question may be included in a set of screening questions to enable the adherence to country-specific privacy laws. In one embodiment, an age question is included within each set of screening question to identify and screen individuals that are under a specific age. In certain embodiments, if a respondent does not meet certain requirements (i.e. is not thirteen years of age or older) the respondents answers to the screening questions are discarded and the respondent is denied participation in any of the active surveys.

Selecting a Particular Survey for a Respondent

Once the set of screening questions has been formulated, it is presented to the respondent. Upon providing answers to the screening questions, the survey assigning server 716 dynamically selects and presents the respondents with a selected survey. In one embodiment, the survey that is selected by survey assigning server 716 is based, at least in part, on the respondent's answers to the screening questions. In certain embodiments, the survey that is selected by survey assigning server 716 is also based, at least in part, on the current survey participation data that is associated with the active surveys. For example, some or all of the criteria that was previously described above for selecting questions to present to a respondent may also be used to select the particular survey that is to be presented to a respondent.

In certain situations, survey assigning server 716 may identify two or more "candidate" surveys for the respondent. In one embodiment, if survey assigning server 716 identifies two or more "candidate" surveys for presenting to the respondent, survey assigning server 716 uses current survey participation data to select a particular survey for presenting to the respondent. For example, if survey assigning server 716 determines that the respondent qualifies for surveys 732, 734 and 736, survey assigning server 716 may (1) select survey 732 because it is scheduled to become inactive before surveys 734 and 744; (2) select survey 734 because it currently has the lowest percentage of completions to desired completions (i.e. 1/500); or (3) select survey 734 because a respondent that has the necessary target participation criteria 744 (female, investor, age 25+) is harder to find than respondents with the necessary target participation criteria for surveys 732 (male) and 734 (investor). Similarly if the survey assigning server 716 identifies zero "candidate" surveys, in certain embodiments the survey assigning server 716 may assign the respondent to a "default" survey.

In another embodiment, upon determining that a respondent is equally eligible for two or more surveys, the system randomly assigns the respondent to one of the candidate surveys. This randomization process has been shown in certain instances to produce high quality research results.

Sequence for Assigning a Survey to a Respondent

Figure 8:
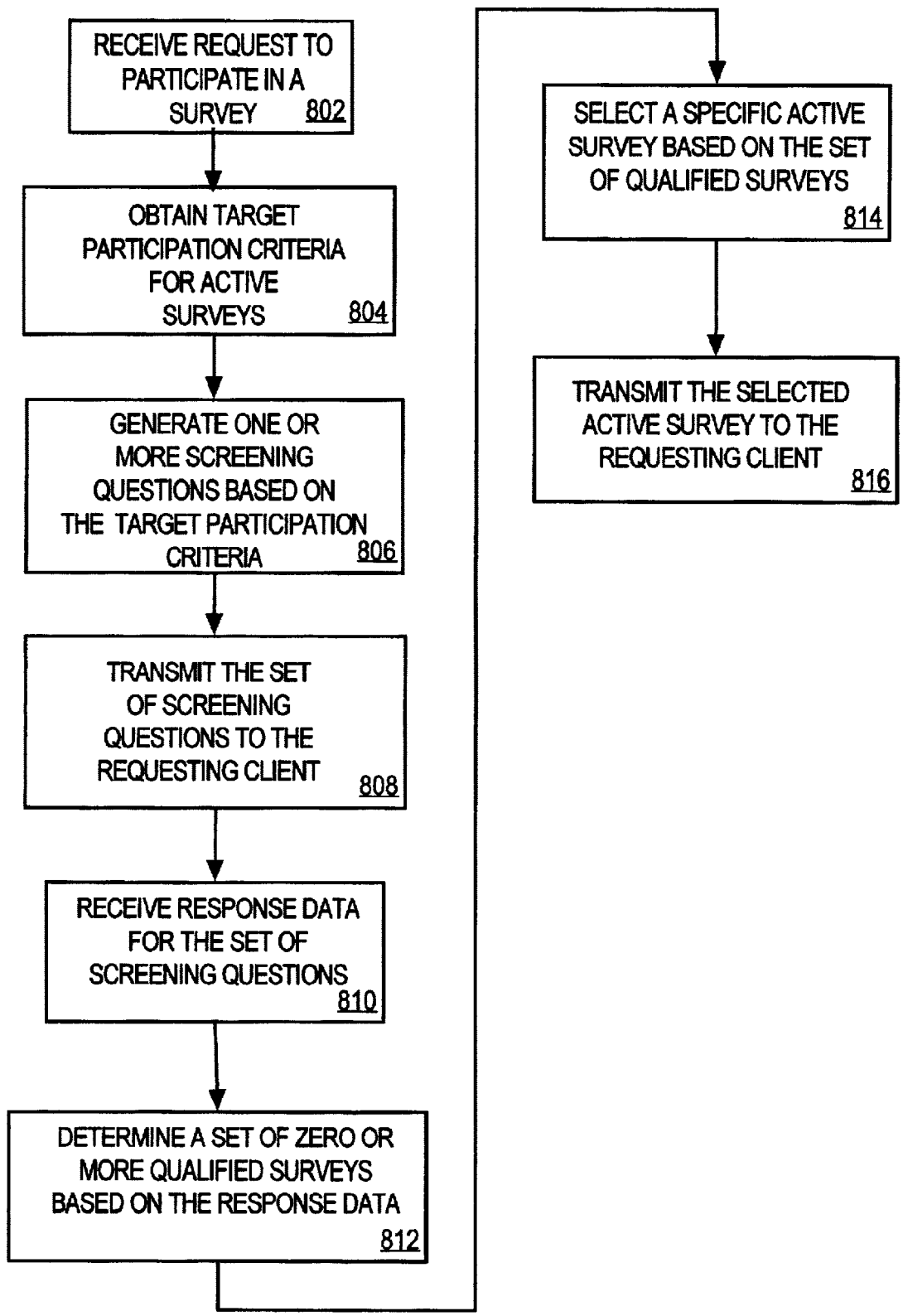
FIG. 8 is a flow diagram that illustrates an example of a sequence that may be used for assigning a survey to a respondent.

FIG. 8 illustrates a flow diagram for assigning a survey to a respondent in accordance with certain embodiments of the invention. For explanation purposes, FIG. 8 will be described in reference to the components of FIG. 7.

At block 802, a participation request is received from a respondent for participation in a survey. As previously indicated, requests to participate in a survey may be initiated using a variety of mechanisms. For example, by selecting an online ad banner 704, or by selecting an embedded URL within an email message which are linked to survey assigning server 716, a respondent may send a message to survey assigning server 716 to request participation in a survey.

At block 804, in response to receiving the participation request, target participation criteria for the active surveys is retrieved to determine a set of one or more screening questions that are to be presented to the respondent. For example, in response to receiving a participation request from client 714, screening question generator 722 interfaces with the database of active surveys 728 to identify a list of active surveys. Based on the list of active surveys, screening question generator 722 retrieves target participation criteria data from database 729. FIG. 9 illustrates an example set of active survey data 900 that may be maintained for the active surveys.

At block 806, a set of one or more screening questions is generated. In one embodiment, the set of screening questions is based at least in part on the target participation criteria data that was received in block 804. For example, based on the retrieved target participation criteria data, screening question generator 722 interfaces with screening question mapping mechanism 730 to generate a set of one or more screening questions. In one embodiment, the set of one or more screening questions are generated "on-the-fly," based on the target participation criteria that currently exists for the active surveys.

At block 808, the set of one or more screening questions is sent to the respondent for answering by the respondent. For example, once the set of screening questions are generated, question presenter process 724 transmits interface data to client 714 to present the set of screening questions to respondent 760. FIG. 10 illustrates an example set of screening questions 1000 that maybe displayed on client 714 for respondent 760.

At block 810, response data is received based on the respondent's answers to the set of screening questions. For example, in response to the respondent 760 completing the set of one or more screening questions, client 714 transmits response data to question presenter process 724.

At block 812, a set of zero or more candidate surveys is identified based on the respondent's answers to the set of screening questions. For example, if the respondent's answers indicate that the respondent 760 is both a "male" and an "investor," assignment and distribution process 726 may select active surveys 732 and 734 as the set of zero or more candidate surveys. Alternatively, if the respondent's answers indicate that the respondent 760 is a "female" that is of age "18," assignment and distribution process 726 may select no active surveys (i.e. empty set) to be the set of zero or more candidate surveys.

At block 814, a specific survey is selected based on the identified set of zero or more candidate surveys. For example, if the set of zero or more candidate surveys includes a single active survey, that survey or a "default" survey will generally be selected as the specific active survey. Alternatively, if the set of zero or more candidate surveys includes two or more active surveys, assignment and distribution process 726 determines which of the two or more active surveys should be presented to the respondent 760. In one embodiment, assignment and distribution process 726 selects the specific survey based at least in part on the current survey participation data.

Additionally, if the set of zero or more candidate surveys includes zero active surveys, assignment and distribution process 726 determines which of the active surveys should be presented to the respondent 760. Here again, the assignment and distribution process 726 may select the specific survey based at least in part on the current survey participation data.

At block 816, the selected survey is transmitted to the requesting client for participation by the respondent. For example, after selecting a particular survey, assignment and distribution process 726 transmits interface data to client 714 to cause the selected survey to be presented to respondent 760.

As indicated above, the set of screening questions may be provided to a respondent in a cascading manner so as to allow survey assigning server 716 to base a subsequent question, at least in part, on the answer that was given to a previously presented question. For example, in certain embodiments, in response to receiving the response data at block 810, the sequence may loop back to block 806 to generate one or more screening questions that are based, at least in part, on prior responses previously received from the respondent.

Alternatives, Extensions

In describing certain embodiments of the invention, several drawing figures have been used for explanation purposes. However, the invention is not limited to any particular. The invention includes other contexts and applications in which the mechanisms and processes described herein is available to other mechanisms, methods, programs, and processes. Thus, the specification and drawings are, accordingly, to be regarded in an illustrative rather than a restrictive sense.

For example, although example were described in which the selected active survey was transmitted to the same client that received the set of one or more screening questions, in certain embodiments, the selected active survey and the set of one or more screening questions may actually be sent to different clients, and possibly for different respondents. Likewise, the source of the initial participation request may be different than the client that receives the set of one or more screening questions and/or the selected active survey.

Additionally, although FIG. 7 depicts a single survey assigning server 716, embodiments of the invention are not limited to any particular number of survey assigning servers. In addition, although survey assigning server 716 is depicted as a single component, it may actually consist of multiple computing and/or storage units that are configured to perform the functions described herein.

In addition, in this disclosure, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

What is claimed is:

1. A method for assigning a survey to a respondent, the method comprising the steps of:

determining which surveys, of a plurality of electronic surveys stored in a machine-readable medium, constitute a set of active surveys;

after determining which surveys constitute the set of active surveys, performing the steps of a computerized system automatically generating a set of one or more screening questions by selecting the set of screening questions from a larger set of available screening questions based on a set of one or more factors;

wherein each screening question in said larger set of available screening questions corresponds to one or more surveys in said set of active surveys;

wherein one of the factors used by the computerized system to determine whether a particular available screening question is selected for said set of screening questions hinges on the one or more surveys to which said particular available screening question corresponds;

wherein at least one screening question in said set of one or more screening questions is automatically generated by the computerized system, based on target participation criteria associated with a particular survey of said set of active surveys, to determine whether respondents qualify to take said particular survey;

wherein said computerized system generates the set of one or wore screening questions based on the target participation criteria of at least two distinct surveys in the set of active surveys;

the computerized system sending electronic signals that cause said set of screening questions to be presented to said respondent;

the computerized system receiving input data in response to said respondent answering said set of one or more screening questions; and the computerized system determining which survey within the previously established set of active surveys to present to said respondent based on how said respondent answered said set of one or more screening questions.

2. The method of claim 1, further comprising the steps of:
receiving over a network an electronic message that represents a request to participate in a survey; and
generating said set of one or more screening questions in response to receiving said electronic message.

3. The method of claim 2, wherein the step of receiving a request to participate in a survey comprises the step of receiving said request in response to said respondent selecting a banner that is displayed in an interface window of a client device.

4. The method of claim 2, wherein the step of receiving a request to participate in a survey includes the step of receiving, as part of said request, supplemental information that is associated with a client device that was used by said respondent for requesting to participate in a survey.

5. The method of claim 4, wherein the step of receiving supplemental information comprises the step of receiving cookie information that is associated with said client device that was used by said respondent for requesting to participate in a survey.

6. The method of claim 4, wherein the step of receiving supplemental information comprises the step of receiving URL information that is associated with said client device that was used by said respondent for requesting to participate in a survey.

7. The method of claim 4, wherein the step of generating said set of one or more screening questions includes the step of generating said set of one or more screening questions based on said supplemental information that is associated with said client device that was used by said respondent for requesting to participate in a survey.

8. The method of claim 2, wherein:
the step of receiving a request to participate in a survey comprises the step of receiving said request to participate in said survey over a network system; and
the step of generating said set of one or more screening questions further comprises the step of providing said respondent with said one or more screening questions by sending, over said network system, data associated with said one or more screening questions.

9. The method of claim 1, wherein the step of generating a set of one or more screening questions further comprises the step of generating said set of one or more screening questions based on current survey participation data that is associated with said one or more active surveys.

10. The method of claim 1, wherein the step of determining; which survey to present to said respondent comprises the steps of:
based on said input data, identifying a candidate group of one or more surveys from said one or more active surveys; and
selecting a particular active survey from said candidate group of one or more surveys based on current survey participation data associated with the surveys in said candidate group of one or more surveys.

11. The method of claim 1, further comprising the steps of:
maintaining a mapping between target participation criteria and a pool of one or more available screening questions; and
generating said set of one or more screening questions based on said mapping between said target participation criteria and said pool of one or more available screening questions.

12. The method of claim 1 wherein one of the factors used by the computerized system to determine whether the particular available screening question is selected for said set of screening questions is based on an elapsed time since becoming active of the one or more surveys to which said particular available screening question corresponds.

13. The method of claim 1 wherein one of the factors used by the computerized system to determine whether the particular available screening question is selected for said set of screening questions is based on how much time remains until the one or more surveys to which said particular available screening question corresponds is no longer considered active.

14. The method of claim 1 wherein one of the factors used by the computerized system to determine whether the particular available screening question is selected for said set of screening questions is based on a current number of completes that have been obtained for the one or more surveys to which said particular available screening question corresponds.

15. The method of claim 1 wherein one of the factors used by the computerized system to determine whether the particular available screening question is selected for said set of screening questions is based on a rate of acquired completions for the one or more surveys to which said particular available screening question corresponds.

16. The method of claim 1 wherein one of the factors used by the computerized system to determine whether the particular available screening question is selected for said set of screening questions is based on how many completions are still required for the one or more surveys to which said particular available screening question corresponds.

17. The method of claim 1 wherein one of the factors used by the computerized system to determine whether the particular available screening question is selected for said set of screening questions is based on a survey completion rate of the one or more surveys to which said particular available screening question corresponds.

18. A computer-readable medium carrying one or more sequences of one or more instructions for assigning a survey to a respondent, the one or more sequences of one or more instructions including instructions which, when executed by one or more processors, cause the one or more processors to perform the steps of:
determining which surveys, of a plurality of electronic surveys stored in a machine-readable medium, constitute a set of active surveys;

after determining which surveys constitute the set of active surveys, performing the steps of:
a computerized system automatically generating a set of one or more screening questions by selecting the set of screening questions form a large set of available screening questions based on a set of one or factors;
wherein each screening question in said larger set of available screening questions corresponds to one or more surveys in said set of active surveys;
wherein one of the factors used by the computerized system to determine whether a particular available screening question is selected for said set of screening questions hinges on the one or more surveys to which said particular available screening question corresponds;
wherein at least one screening question in said set of one or more screening questions is automatically generated by the computerized system, based on target participation criteria associated with a particular survey of said set of active surveys, to determine whether respondents qualify to take said particular survey;
wherein said computerized system generates the set of one or more screening questions based on the target participation criteria of at least two distinct surveys in the set of active surveys;
the computerized system sending electronic signals that cause said set of screening questions to be presented to said respondent;
the computerized system receiving input data in response to said respondent answering said set of one or more screening questions; and
the computerized system determining which survey within the previously established set of active surveys to present to said respondent based on how said respondent answered said set of one or more screening questions.

19. The computer-readable medium of claim 18, further comprising instructions for performing the steps of:
receiving a request to participate in a survey; and
generating said set of one or more screening questions in response to receiving said request.

20. The computer-readable medium of claim 19, wherein the step of receiving a request to participate in a survey comprises the step of:
receiving said request in response to said respondent selecting a banner that is displayed in an interface window of a client device.

21. The computer-readable medium of claim 19, wherein the step of receiving a request to participate in a survey includes the step of receiving, as part of said request, supplemental information that is associated with a client device that was used by said respondent for requesting to participate in a survey.

22. The computer-readable medium of claim 21, wherein she step of receiving supplemental information comprises the step of receiving cookie information that is associated with said client device that was used by said respondent for requesting to participate in a survey.

23. The computer-readable medium of claim 21, wherein the step of receiving supplemental information comprises the step of receiving URL information that is associated with said client device that was used by said respondent for requesting to participate in a survey.

24. The computer-readable medium of claim 19, wherein the step of generating said set of one or more screening questions includes the step of generating said set of one or more screening questions based on said supplemental information that is associated with said client device that was used by said respondent for requesting to participate in a survey.

25. The computer-readable medium of claim 19, wherein:
the step of receiving a request to participate in a survey comprises the step of receiving said request to participate in said survey over a network system; and
the step of generating said set of one or more screening questions further comprises the step of providing said respondent with said one or more screening questions by sending, over said network system, data associated with said one or more screening questions.

26. The computer-readable medium of claim 18, wherein the step of generating a set of one or more screening questions further comprises the step of generating said set of one or more screening questions based on current survey participation data that is associated with said one or more active surveys.

27. The computer-readable medium of claim 18, wherein the step of determining which survey to present to said respondent comprises the steps of:
based on said input data, identifying a candidate group of one or more surveys from said one or more active surveys; and
selecting a particular active survey from said candidate group of one or more surveys based on current survey participation data associated with the surveys in said candidate group of one or more surveys.

28. The computer-readable medium of claim 18, further comprising instructions for performing the steps of:
maintaining a mapping between target participation criteria and a pool of one or more available screening questions; and
generating said set of one or more screening questions based on said mapping between said target participation criteria and said pool of one or more available screening questions.

29. A system for assigning a survey to a respondent, the system comprising:
a memory;
one or more processors coupled to the memory; and
a set of computer instructions contained in the memory, the set of computer instructions including computer instructions which when executed by the one or more processors, cause the one or more processors to perform the steps of:
determining which surveys, of a plurality of electronic surveys stored in a machine-readable medium, constitute a set of active surveys;
after determining which surveys constitute the set of active surveys, performing the steps of
automatically generating a set of one or more screening questions by selecting the set of screening questions from a larger set of available screening questions based on a set of one or more factors;
wherein each screening question in said larger set of available screening questions corresponds to one or more surveys in said set of active surveys;
wherein one of the factors used by the computerized system to determine whether a particular available screening question is selected for said set of screening questions hinges on the one or more surveys to which said particular available screening question correspond;

wherein at least one screening question in said set of one or more screening questions is automatically generated by the computerized system, based on target participation criteria associated with a particular survey of said set of active surveys, to determine whether respondents qualify to take said particular survey;

wherein said computerized system generates the set of one or more screening questions based on the target participation criteria of at least two distinct surveys in the set of active surveys;

sending electronic signals that cause said set of screening questions to be presented to said respondent;

receiving input data in response to said respondent answering said set of one or more screening questions; and determining which survey within the previously established set of active surveys to present to said respondent based on how said respondent answered said set of one or more screening questions.

30. The system of claim 29, further comprising instructions for performing the steps of:

receiving a request to participate in a survey; and generating said set of one or more screening questions in response to receiving said request.

31. The system of claim 30, wherein the step of receiving a request to participate in a survey comprises the step of receiving said request in response to said respondent selecting a banner that is displayed in an interface window of a client device.

32. The system of claim 30, wherein the step of receiving a request to participate in a survey includes the step of receiving, as part of said request, supplemental information that is associated with a client device that was used by said respondent for requesting to participate in a survey.

33. The system of claim 32, wherein the step of receiving supplemental information comprises the step of receiving cookie information that is associated with said client device that was used by said respondent for requesting to participate in a survey.

34. The system of claim 32, wherein the step of receiving supplemental information comprises the step of receiving URL information that is associated with said client device that was used by said respondent for requesting to participate in a survey.

35. The system of claim 32, wherein the step of generating said set of one or more screening questions includes the step of generating said set of one or more screening questions based on said supplemental information that is associated with said client device that was used by said respondent for requesting to participate in a survey.

36. The system of claim 30, wherein:

the step of receiving a request to participate in a survey comprises the step of receiving said request to participate in said survey over a network system; and the step of generating said set of one or more screening questions further comprises the step of providing said respondent with said one or more screening questions by sending, over said network system, data associated with said one or more screening questions.

37. The system of claim 29, wherein the step of generating a set of one or more screening questions further comprises the step of generating said set of one or more screening questions based on current survey participation data that is associated with said one or more active surveys.

38. The system of claim 29, wherein the step of determining which survey to present to said respondent comprises the steps of:

based on said input data, identifying a candidate group of one or more surveys from said one or more active surveys; and selecting a particular active survey from said candidate group of one or more surveys based on current survey participation data associated with the surveys in said candidate group of one or more surveys.

39. The system of claim 29, further comprising instructions for performing the steps of:

maintaining a mapping between target participation criteria and a pool of one or more available screening questions; and generating said set of one or more screening questions based on said mapping between said target participation criteria and said pool of one or more available screening questions.

* * * * *

UNITED STATES PATENT AND TRADEMARK OFFICE
CERTIFICATE OF CORRECTION

| | |
|---|---|
| PATENT NO. | : 6,993,495 B2 |
| APPLICATION NO. | : 09/781523 |
| DATED | : January 31, 2006 |
| INVENTOR(S) | : Leroy Smith, Jr. et al. |

It is certified that error appears in the above-identified patent and that said Letters Patent is hereby corrected as shown below:

DRAWINGS – Sheet 11 of 11
Please delete the drawing and replace with enclosed originally submitted Figure 10.

Column 27
Claim 18, lines 6-7: Delete "one or factors;" and insert --one or more factors;--.

Claim 24, line 66: Delete "claim 19" and insert --claim 21--.

Column 28

Claim 29, line 67: Delete "correspond;" and insert --corresponds;--.

Signed and Sealed this

Seventeenth Day of October, 2006

JON W. DUDAS
*Director of the United States Patent and Trademark Office*

FIG. 10

EXAMPLE SET OF SCREENING QUESTIONS 1000

INSIGHT
E X P R E S S

These few questions are to locate a survey of interest to you.

So, Have Fun!

1. So, you want to be a Millionaire? Okay, here's your big chance to tell us what you think. "What do most people do after hours?" (See what others say: the results will be provided TO YOU after the attached survey!)

[Not Selected ▼]

2. What is your age group? (Select one)

[Not Selected ▼]

3. In which of the following areas are you interested? (Select all that apply)
   - ☐ Automobiles
   - ☐ Business
   - ☐ Sports
   - ☐ Technology 4. What is your gender? (Select one)

[Not Selected ▼]

[Next >>]

Copyright 1999, 2000 InsightExpress, LLC, all rights Reserved. Patent Pending. Respondent Privacy Statement